Dec. 15, 1970  H. B. MINASIAN  3,548,196
METHOD AND APPARATUS FOR AUTOMATICALLY CENTERING
FABRIC WORKPIECES REGARDLESS OF THEIR
SIZE WITHIN THE OPERATING RANGE
Filed June 5, 1968
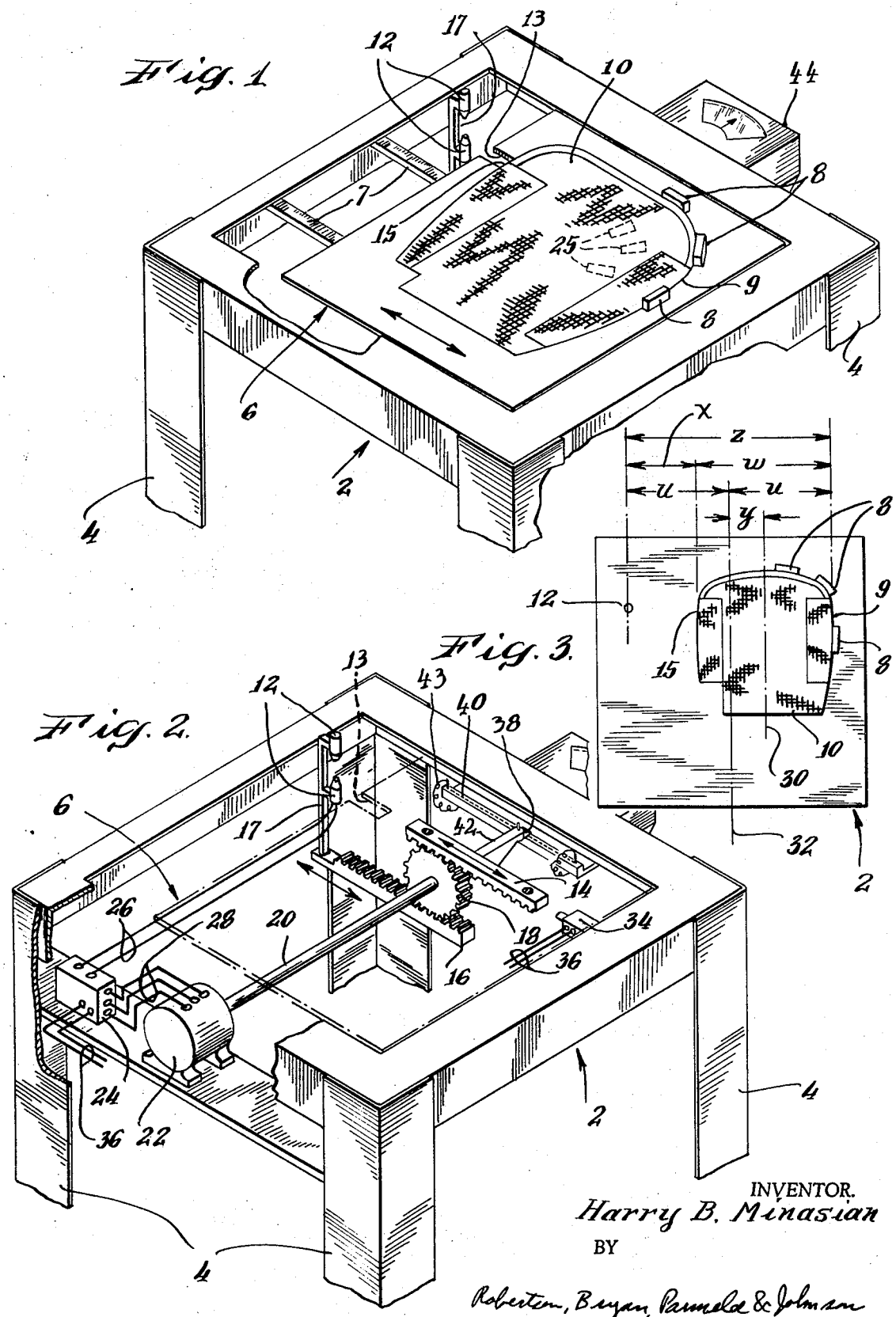
INVENTOR.
Harry B. Minasian
BY
Roberton, Bryan, Parmelee & Johnson
ATTORNEYS.

United States Patent Office 3,548,196
Patented Dec. 15, 1970

3,548,196
METHOD AND APPARATUS FOR AUTOMATICALLY CENTERING FABRIC WORKPIECES REGARDLESS OF THEIR SIZE WITHIN THE OPERATING RANGE
Harry B. Minasian, Bronx, N.Y., assignor to Ivanhoe Research Corporation, New York, N.Y., a corporation of Delaware
Filed June 5, 1968, Ser. No. 734,660
Int. Cl. G06m 7/00
U.S. Cl. 250—224      10 Claims

ABSTRACT OF THE DISCLOSURE

The invention provides a method and apparatus for automatically centering workpieces, regardless of the size of the particular workpiece being centered, and for sensing changes in size of the respective workpieces, thus enabling various sizes of workpieces to be automatically processed as desired. The apparatus of this invention includes a movable worktable on which each workpiece is placed and movable sensing means, the worktable and sending means being caused to move equal distances in opposite directions and at the same rate to determine and locate the center of the workpiece. Drive means and response control means are provided to coordinate the movement in opposite directions of the sensing means and of the worktable, and size sensing means responds to the movement of the worktable to determine the size of the workpiece being processed. The workpiece is initially placed on the movable worktable with a first of its edges located in a pre-determined position, and then the worktable and the sensing means are caused to move equal distances in opposite directions and at the same rate. When a second edge of the workpiece diametrically opposite to the first edge is sensed, a signal is transmitted that serves to de-energize the drive means to cause the movable worktable to stop. The method performed is such that at this stopped position the center of the workpiece coincides with the center of the apparatus, thus the center of the workpiece has been acccrately located as to be suitably positioned in readiness for further processing.

---

As background of this invention it is noted that in manufacturing, there are numerous situations in which an operator needs to determine the center of different workpieces in order to perform further work on them. Such workpieces may be the cloth panel which is used to form the pocket in a man's trousers, the fabric blank which is used to form the back of a blouse or skirt, in order to locate the center position where the collar is to be placed thereon, or any workpiece used in making apparel, headgear, footwear, home furnishings and the like where there is needed a centerline or equal halves of the fabric workpiece. Conventional prior art techniques have been for an operator to determine the center of a workpiece by measurement or by bringing the two opposite edges together and then by creasing the center region of the workpiece to locate the centerline.

Among the many advantages of the method and apparatus provided by this invention are those resulting from the fact that the workpieces are automatically centered regardless of their size within the operating range, and in addition the size of each workpiece may be automatically sensed to provide information for use in its processing. Moreover, a simple, accurate and efficient method is provided for locating and determining the center of any fabric workpiece as desired. Also, the center line is determined very quickly and completely automatically without any trouble or bother on the part of an operator.

Further advantages of apparatus embodying the present invention are that it may be used to determine the center of various sizes and types of material that may be manufactured or assembled. There are many types of workpieces such as used in drapes, curtains, men's and women's apparel in which there may be a design that is going to be applied or formed and it is necessary to determine the center thereof in order to have a symmetrical structure or design consistent throughout on the respective workpieces. By means of the present invention, this can be accomplished simply, efficiently, automatically and very quickly which are of prime consideration in the manufacture of articles, apparel, headgear, footwear, home furnishings, and the like.

As used herein the term "workpiece" is intended to include individual pieces as well as sub-assemblies or semi-finished goods including two or more pieces or components secured together by suitable fastening. The term "fabric" is intended to include woven goods and also nonwoven or knitted, felted, porous or perforated goods, and similar goods having flexible or pliable characteristics which are suitable for use in the manufacture of fabric articles, such as, apparel, headgear, footwear, home furnishings and similar uses, regardless of whether the material of the goods is in one layer or multiple layers and regardless of whether the goods are natural, synthetic, or blended.

This invention relates to a method and apparatus for automatically centering a workpiece. The apparatus includes a movable supporting worktable on which to place the workpiece, this worktable having registration stops against which a first edge of workpiece is initially positioned. Positioned off to one side of the movable worktable are sensing means operatively associated with the worktable for sensing a second edge of the workpiece to determine its center. Drive means are provided to cause the worktable and the sensing means to move in opposite directions, for equal distance and at the same rate. Response-control means are provided which are associated with said sensing means and with the drive means so that when the sensing and drive means have moved a distance such that the available space between the registration stops and sensing means has become exactly equal to the width of the particular workpiece, a signal from the sensing means to the response-control means serves to de-energize the drive means, thereby stopping all movement of the apparatus, and when this occurs, the center of the fabric workpiece exactly coincides with the center of the apparatus, and its over-all size may be accurately sensed.

The various objects, aspects and advantages of my invention will in part be pointed out in conjunction with the following description of the drawings and will in part be understoood from the following description.

With reference to the drawings, I shall describe the presently preferred method and apparatus embodiments of my invention.

In the drawings:

FIG. 1 is a perspective view of the apparatus embodying the invention;

FIG. 2 is a perspective view of the apparatus of FIG. 1 illustrating the method and showing the operative association of the sensing means, drive means, and response-control means; and FIG. 3 is a plan view of the top surface of the apparatus showing the relative positions of the workpiece, movable worktable and sensing means and workpiece size sensing means, and further illustrating the method of the invention.

Referring to FIGS. 1 and 2, the illustrative embodiment of the apparatus in its general arrangement comprises a modular unit of equipment 2 having a square floor plan suitable for use as a component in an automatic production line for the manufacture of fabric articles such as apparel, headgear, footwear, home furnishings, and the like. This apparatus 2 is mounted on legs 4, and there is slidably positioned in the middle of the top surface a movable worktable 6. The worktable 6 is arranged to move laterally back and forth along guide rails 7 in the top of the module 2. Positioned off center near one side of the movable worktable 6 are registration stops 8. The workpiece 10 which is illustratively shown as a fabric panel is initially placed on the worktable 6 with a first of its edges 9 in alignment with these stops 8, i.e. abutting against these stops. To the other side of the movable worktable 6, there are sensing means in the form of a light source directed toward a photocell, i.e. an electric eye 12, which as described below, moves laterally with respect to the worktable 6 to determine the center of the fabric workpiece 10.

As will be described below, the fabric workpiece 10 supported on the movable worktable 6 is moved toward the electric eye 12, and when the second edge 15 of the workpiece interrupts the beam of the electric eye 12, the movable worktable 6 is caused to stop by a signal sent by the electric eye 12 to the response-control means, which in turn de-energizes the motor, as shown in FIG. 2.

The operative association of the drive means 22 and response-control means 24 with the movable worktable 6 and electric eye 12 is shown in FIG. 2. As shown, a rack 14 connected to the worktable 6 is provided to move the worktable laterally back and forth on guide rails 7 (FIG. 1). Similarly, a second rack 16 is connected to a carriage 17 so as to move the electric eye 12 mounted on the carriage 17 laterally back and forth. The racks 14 and 16 are driven by a drive pinion 18. The rack 16 and carriage 17 are guided in their movement by suitable guide means (not shown) secured to the frame of the unit 2. By rotation of the pinion 18, the worktable 6 and electric eye 12 are caused to move an equal distance in opposite directions. A shaft 20 extends from the drive pinion 18 to the drive means 22 which includes an electric motor and a speed reducing gear unit. The motor in drive means 22 is of the type to move the drive pinion 18 when energized at a uniform and constant rate. Connected by wiring to the motor 22 and to the electric eye 12, is the response-control means 24. This response control means may be any suitable electrical control unit which will energize the motor 22 after the edge 9 of the workpiece is correctly positioned and de-energize the motor 22 when the sensing means 12 is actuated, as required to operate and stop the modular unit 2.

In operating the modular unit 2, initially the right edge 9 is positioned as far away from the centerline 32 of the centering unit 2 as the sensing means 12 is positioned away from this centerline on the opposite side of the unit 2. The fabric workpiece 10 is initially placed on the worktable 6 with its right edge 9 positioned against the stops 8. The workpiece 10 may be manually placed against the edge stops 8, but it is usually preferable to register the edge 9 against the stops 8 by automatic edge registration means. For example, as indicated in dotted outline in FIG. 1, such edge registration means may comprise a plurality of pulsating air jet units 25 mounted in the surface of the worktable 6. These units 25 direct pulses of air beneath the workpiece and along the upper surface of the worktable toward the stops 8, and the pulses of air occur in sequence for impelling the edge 9 of the workpiece against the stops 8. In order to feed the pulsating air in sequence to the respective registration units there are flexible air lines connected from a suitable source. Such air jet registration units are disclosed in detail and claimed in a copending application of Herman Rovin et al. Ser. No. 619,302, filed Feb. 28, 1967.

After the workpiece has been registered against these stops 8, a switch (not shown) is actuated which causes the shaft 20 to revolve and rotate the drive pinion 18, causing the worktable 6 and electric eye 12 driven by racks 14 and 16, respectively, to move toward each other.

The fabric workpiece 10 and the electric eye 12 each move equal distances toward each other, until the left edge 15 of the workpiece 10 interrupts the beam of the electric eye 12. There is a cut-out slot 13 extending inwardly from the edge of the worktable 6 to provide access for the sensing means 12 to sense the edge 15 of the workpiece, i.e. to interrupt the light beam. This interruption will cause a signal to be sent from the electric eye 12 through wires 26 to the response-control means 24 which will in turn, through wires 28, de-energize the motor 22. The worktable 6 thereupon stops at a position at which the center of fabric workpiece 10 coincides with the centerline 32 of the apparatus 2. Thus, the center of the workpiece is located and it is ready for further processing, such as in an automatic production line.

In FIG. 3, the initial relative positions are shown of the edge stops 8, the fabric workpiece 10, the apparatus 2 and the edge sensing means 12. The various letter symbols $u$, $w$, $x$, $y$ and $z$ represent various relationships and dimensions, as will be explained. The letter $u$ represents the initial distance between the centerline 32 of the unit 2 and the first workpiece edge 9 and also represents the initial distance between the centerline 32 and the initail position of the sensing means 12. The letter $w$ is the width of the workpiece 10; the letter $x$ is the initial distance between the second edge 15 and the sensing means 12; the letter $y$ is the distance between the centerline 30 of the workpiece 10 and the centerline 32 of the apparatus 2, this distance $y$ being equal to the distance that the workpiece 10 moves to the left and the sensing means 12 moves to the right; and the letter $z$ represents the initial distance between the sensing means 12 and the first edge 9. The dimensions indicated by $u$ and $z$ can be adjusted by changing the initial positions of the racks 14 and 16, but they are constants for any particular apparatus 2 during its operation and thus will be the same for each workpiece being centered, while the dimensions $w$, $x$ and $y$ vary. The distance $y$ is always one-half of the distance $x$, because the relative motion between the sensing means 12 and the edge 15 is twice as fast as the relative motion between the workpiece centerline 30 and the apparatus centerline 32. Thus, the apparatus centerline 32 always bisects the distance between the first edge 9 and the sensing means 12. When the second edge 15 encounters the sensing means 12, at this instant the centerline 30 of the workpiece will coincide with the centerline 32 of the apparatus 2, and the motion ceases with the workpiece in its centered position.

By substituting actual numerals for the letter symbols $u$, $w$, etc., the relationship of the various dimensions will be further pointed out. For example, when the initial distances $u$ from the centerline 32 of the apparatus 2 is 8 inches, the initial distance $z$ between the electric eye 12 and the first edge 9 is 16 inches, and the width $w$ of the workpiece 10 is 12 inches, then $x$ is 4 inches and $y$ is 2 inches. Thus, the workpiece 10 moves 2 inches to the left while the electric eye 12 moves 2 inches to the right so that $x$ is reduced to zero and then the centerline 30 of the workpiece 10 coincides with the centerline 32 of the apparatus, and the workpiece 10 is centered.

As another example, assume that a wider workpiece is used, having a width of 14 inches. The dimensions $u$ and $z$ are the same as before, namely 8 inches and 16 inches, respectively. In this example $y$ is one inch and $x$ is two inches. When the distance $y$ has been reduced to zero, the distance $x$ has also been reduced to zero, so that centerline 30 has been brought into coincidence with centerline 32.

Now that the workpiece is centered, further work may be performed thereon as desired, for example it may automatically be folded in half. In this illustrative example the workpiece 10 is a pocket panel for forming a side pocket in a man's pants, and when it is folded in half its adjacent edges may then be sewn together to form the pocket closure or bag.

Instead of performing further work on the workpiece when it is centered on the unit 2, it may automatically be transferred from its centered position over to another workstation by suitable transfer means (not shown) and then further work may be performed thereon at such other workstation.

Advantageously, this apparatus may also be used automatically to sense the size of each workpiece and to sense change in sizes from one workpiece to the next. As shown in FIG. 2, size sensing means may be utilized, including a finger 38 secured to the movable table 6 by being attached in the region of the rack 14. This finger 38 carries an electrical contact which slides along a potentiometer 40. An electrical circuit is formed by a wire 42 extending from the contact 38 and a second wire 43 extending from one end of the potentiometer 40, these wires being connected to size indicating and response control means 44. The size response means 44 includes a source of electrical energy and a meter mechanism arranged to move to a position corresponding with the position of the finger 38 along the potentiometer 40. The control means 44 may include a sequence of microswitches which are actuated by the movement of the meter mechanism for controlling other equipment in the production line in accordance with the size of the particular workpiece being handled.

In an alternative arrangement, a sequence of microswitches may be arranged along a line corresponding generally to the position of the potentiometer strip 40, and the finger 38 then actuates the respective switches as it moves along the line 40. These microswitches are connected to size indicating means as at 44 and are arranged to control other equipment in the production line, in accordance with the size of the particular workpiece being processed.

In either arrangement the size sensing is accomplished by sensing the amount of movement of the table 6 which has occurred to determine the size of the workpiece thereon.

After the workpiece 10 has been removed, the control means 24 is actuated by a suitably positioned limit switch (not shown) which becomes operated for energizing the drive means 22 in reverse direction to move the worktable 10 back to its initial position. When the worktable 6 and the edge sensing means 12 have reached their respective initial positions, a limit switch 34 is operated by the end of the rack 14. This switch 34 actuates the control means 24 for stopping the worktable 6 and sensing means 12 in their respective initial positions corresponding with the dimension $u$ and $z$.

The operating range of the centering and size sensing unit 2 is defined by an upper limit such that the width $w$ of the widest workpiece cannot exceed the initial distance or span $z$ of the unit. By building a larger centering unit 2 larger workpieces can be handled. The lower limit is that the workpiece can be as narrow as the distance between the right edge stop 8 and the inner end of the sensing slot 13. By making the slot 13 quite long or by using a worktable having a transparent strip therein at the location of the sensing slot 13, it is possible to center workpieces as narrow as may be desired. As a practical matter the narrowest workpieces which are desired to be centered automatically in production are usually at least several inches wide.

It is to be understood that the method and apparatus can be operated in inverse relationship from that described. That is, the right hand stop 8 and sensing means 12 can be initially positioned near each other. Then they are moved away from each other until the sensing means 12 has moved out to the edge 15, at that instant the edge 15 is sensed and the drive means 22 is stopped. In either mode of operation the centerline 32 of the apparatus always bisects the distance between the inner face of the right hand edge stop 8 and the sensing means 12.

From the foregoing it will be understood that the method and apparatus for automatically centering workpieces and for sensing their sizes described herein as illustrative embodiments of the present invention are well suited to provide the advantages set forth, and since many possible embodiments can be made of the features of this invention and as the methods and apparatus described herein may be varied in various parts, all without departing from the scope of the invention, it is to be understood that all matter hereinbefore set forth or shown in the accompanying drawings is to be interpreted as illustrative and not in a limiting sense and that in certain instances some of the features of the invention may be used without a corresponding use of other features or may be modified into equivalent elements, all without departing from the scope of the invention as defined by the following claims.

What is claimed is:

1. The method for automatically locating the center of a fabric workpiece having a width $w$ between a first edge thereof and a second edge on the opposite side from said first edge, said method comprising the steps of placing the fabric workpiece extended to its full width upon a movable supporting surface, registering the first edge in a predetermined position with respect to said movable surface, said predetermined position of the first edge being offset a distance $u$ from a known and stationary line (32), positioning a movable object at a predetermined position on the opposite side of said known and stationary line at a distance $u$ therefrom, moving said supporting surface and said movable object in opposite directions for equal distances and at the same rate until the distance between said movable object and said first edge has become equal to said distance $w$ and then stopping all movement of said supporting surface, whereby at the stopped position of said supporting surface said known and stationary line will bisect the distance between said first and second edges and will thereby coincide with the center of the fabric workpiece for locating the center thereof.

2. The method for automatically locating the center of a fabric workpiece as claimed in claim 1 including the stop of sensing the amount of movement of the movable supporting surface which has occurred to determine the size of the workpiece thereon.

3. The method for automatically locating the center of a fabric workpiece comprising the steps of placing the fabric workpiece extended to its full width on a movable supporting surface, said fabric workpiece being placed so that a first of its edges is located in a predetermined position on said movable surface, said predetermined position being located in relation to a known and stationary line; moving said supporting surface and a movable object toward each other for equal distances and at the same rate, said movable object being positioned in effect perpendicular to the plane in which said supporting surface lies and being on the opposite side of said known and stationary line from said predetermined position of said first edge on said supporting surface; and stopping all movement of said supporting surface and said object when they have been moved a distance such that said object is aligned with the second edge of the workpiece diametrically opposed to said first edge and the available space between the predetermined position of said first edge on the supporting surface and said object has become equal to the width of said fabric workpiece, whereby at this stopped position the center of the fabric workpiece coincides with the known and stationary line.

4. The method for automatically locating the center of a fabric workpiece as claimed in claim 3 including the step of sensing the travel of the movable supporting surface to determine the size of the workpiece thereon.

5. An apparatus for automatically centering a workpiece, said apparatus comprising; a movable supporting worktable on which to place the workpiece, said worktable having registration means with respect to which a first edge of said workpiece is intially positioned, said worktable being arranged to move laterally back and forth; sensing means movably mounted in relation to said worktable and operatively associated with said worktable for sensing a second edge of said workpiece on the opposite side thereof from said first edge to determine the center of said workpiece; drive means for moving both said movable worktable and said sensing means for equal distances in opposite directions and at the same rate; and response-control means associated with said sensing and said drive means so that when said sensing means and drive means have moved a distance such that the available space between the first edge and said sensing means has become equal to the width of said fabric workpiece, a signal from said sensing means to said response-control means serves to de-energize said drive means, thereby stopping movement of said worktable and at this stopped position the center of the workpiece coincides with a known location in said apparatus.

6. An apparatus for automatically centering a workpiece as set forth in claim 5, in which said sensing means is positioned off to one side of said worktable, and said drive means moves said sensing means and said movable worktable toward each other.

7. An apparatus for automatically centering a workpiece as set forth in claim 5, in which said movable worktable is transparent in the region of said second edge to be sensed and said sensing means is an electric eye which transmits a signal to said response-control means to stop said drive means when it senses the second edge of said workpiece.

8. An apparatus for automatically centering a fabric workpiece as set forth in claim 5, in which said drive means for moving both said movable worktable and said sensing means for equal distances in opposite direction and at the same rate includes a first gear rack connected to said movable worktable, a second gear rack connected to said sensing means, and pinion gear means engaging both of said racks.

9. An apparatus for automatically centering a fabric workpiece as set forth in claim 5, in which workpiece size determining means are arranged to be responsive to travel of said movable worktable to determine the size of the workpiece thereon.

10. An apparatus for automatically centering a workpiece, said apparatus comprising; a movable supporting worktable on which to place said workpiece and adapted to have the workpiece extended to its full width while supported thereon, said worktable having registration stops against which a first edge of said workpiece is to be initially positioned; registration means mounted on the moveable worktable for impelling the workpiece to move said first edge against said registration stops; said worktable being arranged to move laterally back and forth; sensing means movably mounted in relation to said worktable and operatively associated with said worktable for sensing a second edge of said workpiece opposite to said first edge to determine the center of said workpiece; drive means for moving both said movable worktable and said sensing means for equal distances in opposite directions and at the same rate; and response-control means associated with said sensing and said drive means and responsive to said sensing means encountering said second edge to de-energize said drive means, thereby stopping movement of said movable worktable and at this stopped position the center of the workpiece coinciding with the center of said apparatus.

References Cited

UNITED STATES PATENTS

| | | | |
|---|---|---|---|
| 2,643,117 | 6/1953 | Frisbie et al. | 250—234X |
| 2,931,917 | 4/1960 | Beelitz | 250—202X |
| 3,207,904 | 9/1965 | Heinz | 250—222X |
| 3,384,753 | 5/1968 | Revesz | 250—219 |

WALTER STOLWEIN, Primary Examiner

U.S. Cl. X.R.

223—1; 250—222, 234